United States Patent
Jan et al.

(10) Patent No.: US 11,301,821 B2
(45) Date of Patent: Apr. 12, 2022

(54) COGNITIVE PRIORITIZATION MODEL FOR HARDWARE DEVICE PREDICTION MAINTENANCE DELIVERY

(71) Applicant: Kyndryl, Inc., New York, NY (US)

(72) Inventors: Ea-Ee Jan, Ardsley, NY (US); Katherine C. Verbist, Sandy Springs, GA (US); Zhi Ping Zhou, Dalian (CN)

(73) Assignee: KYNDRYL, INC., New York, NY (US)

( * ) Notice: Subject to any disclaimer, the term of this patent is extended or adjusted under 35 U.S.C. 154(b) by 303 days.

(21) Appl. No.: 16/031,605

(22) Filed: Jul. 10, 2018

(65) Prior Publication Data
US 2020/0019935 A1    Jan. 16, 2020

(51) Int. Cl.
| G06Q 10/00 | (2012.01) |
| G07F 19/00 | (2006.01) |
| G06Q 10/06 | (2012.01) |
| G06Q 20/10 | (2012.01) |
| G06N 20/00 | (2019.01) |

(52) U.S. Cl.
CPC .......... *G06Q 10/20* (2013.01); *G06N 20/00* (2019.01); *G06Q 10/06311* (2013.01); *G06Q 20/1085* (2013.01); *G07F 19/209* (2013.01)

(58) Field of Classification Search
CPC .......... G06Q 10/20; G06Q 10/06311; G06Q 20/1085; G06N 20/00; G07F 19/209
See application file for complete search history.

(56) References Cited

U.S. PATENT DOCUMENTS

| 8,725,625 B2 * | 5/2014 | Anderson | G06Q 40/06 705/37 |
| 9,342,963 B1 * | 5/2016 | McGraw, IV | G06Q 20/18 |
| 10,552,002 B1 * | 2/2020 | Maclean | G06N 20/00 |
| 2009/0164250 A1 | 6/2009 | Hamilton et al. | |

(Continued)

FOREIGN PATENT DOCUMENTS

WO    WO-2016196775 A1 *  12/2016    ......... G05B 23/0283

OTHER PUBLICATIONS

Gilliland, Mike. "ATM Replenishment: Forecasting + Optimization," available online at https://blogs.sas.com/content/forecasting/2015/01/24/atm-replenishment-forecasting-optimization/ (Year: 2015).*

*Primary Examiner* — Jan P Mincarelli
(74) *Attorney, Agent, or Firm* — Tutunjian & Bitetto, P.C.; Ken Han

(57) ABSTRACT

A method of providing a maintenance schedule that includes generating by a processor of a machine learning hardware device a predictive score for failure for each hardware device failure within a plurality of hardware devices to be serviced; determining by the processor a number of service misses for the hardware devices during a window of service; prioritizing by a processor of the machine learning hardware device each hardware device having a predictive score for failure by a business impact factor; and generating by the processor of the machine learning hardware device a maintenance schedule for the plurality of hardware devices to be serviced using the predictive score that has been prioritized by said business impact factor, wherein the service misses are selected for hardware devices having a lowest priority by the prioritizing of the predictive score by the business impact factor.

14 Claims, 9 Drawing Sheets

(56) References Cited

U.S. PATENT DOCUMENTS

| | | |
|---|---|---|
| 2009/0299800 A1 | 12/2009 | Neilan |
| 2013/0155834 A1 | 6/2013 | Yingling, Jr. et al. |
| 2017/0083822 A1* | 3/2017 | Adendorff .............. G07C 5/006 |
| 2018/0136288 A1* | 5/2018 | Wolfe .................... G01R 31/40 |
| 2019/0096196 A1* | 3/2019 | Cifarelli ................ G06N 5/003 |
| 2019/0258904 A1* | 8/2019 | Ma ....................... G06K 9/6269 |

* cited by examiner

COGNITIVE PRIORITIZATION MODEL FOR HARDWARE DEVICE PREDICTION MAINTENANCE DELIVERY

BACKGROUND

Technical Field

The present invention generally relates to hardware device maintenance, and in some embodiments to the service of automated teller machines (ATMs).

Description of the Related Art

Accurately determining failure of hardware devices, such as automated teller machines (ATM), generally includes inaccurate process with little flexability that does not consider the priority of specific machines within the pool of devices receiving maintenance. Determining specific causes for the equipment failure may include a complicated process that may be time consuming and require a large amount of resources and coordination across multiple parties. Further, maintenance resources should also consider business considerations.

SUMMARY

In accordance with an embodiment of the present disclosure, a method for providing a maintenance schedule is provided that employs a predictive failure score that is prioritized by business impacts. In one embodiment, the method includes receiving a predictive score for failure for each hardware failure within a plurality of hardware devices to be serviced; and setting at least one window to service the plurality of hardware devices. In a following step, the method includes determining a number of service misses for the plurality of hardware devices during the at least one window. The method continues with prioritizing by a processor of the machine learning hardware device each hardware device having a predictive score for failure by a business impact factor. In some embodiments, the method also includes generating by the processor of the machine learning hardware device a maintenance schedule for the plurality of hardware devices to be serviced using the predictive score that has been prioritized by business impact factors. In one embodiment service misses are selected for hardware devices having a lowest priority by the prioritizing of the predictive score by the business impact factor. In some embodiments, the method provides for enhanced business impact based on failure incidents by defining service planning delivery windows and calculating how many machines will be services for each of the planning windows. The method reduces the service miss impact for the prediction windows. In some embodiments, the hardware devices being serviced are automated teller machines (ATMs).

In another aspect, a system is described that provides a maintenance schedule using a predictive failure score that is prioritized by business impacts. The system can include a failure prediction generator for providing a predictive failure score for each hardware device within a plurality of hardware devices to be serviced. The system may further include a business priority data accumulator for collecting business impact data for each hardware device having said predictive failure score; and a business value maintenance generator for prioritizing service to hardware devices having a predictive failure score by at least one business impact factor to provide a maintenance schedule, wherein service misses in the maintenance schedule are selected for the hardware devices having lowest priority by said business impact factor. In some embodiments, the hardware devices being serviced are automated teller machines (ATMs).

In yet another aspect, a computer program product is described herein. The computer product may include a non-transitory computer readable storage medium having a computer readable program for providing a maintenance schedule using a predictive failure score that is prioritized by business impacts. The computer readable program when executed on a computer causes the computer to perform the steps of generating by a processor of a machine learning hardware device the predictive failure score for each hardware device failure within a plurality of hardware devices to be serviced; setting at least one window to service said plurality of hardware devices; and determining by the processor a number of service misses for said plurality of hardware devices during said at least one window The method also includes prioritizing by the processor of the machine learning hardware device each hardware device having a predictive score for failure by a business impact factor; and generating by the processor of the machine learning hardware device a maintenance schedule for the plurality of hardware devices to be serviced using the predictive score that has been prioritized by the business impact factor. Service misses are selected for hardware devices having a lowest priority by said prioritizing of said predictive score by said business impact factor. In some embodiments, the hardware devices being serviced are automated teller machines (ATMs).

BRIEF DESCRIPTION OF THE DRAWINGS

The following description will provide details of preferred embodiments with reference to the following figures wherein.

DETAILED DESCRIPTION

Figure 1:
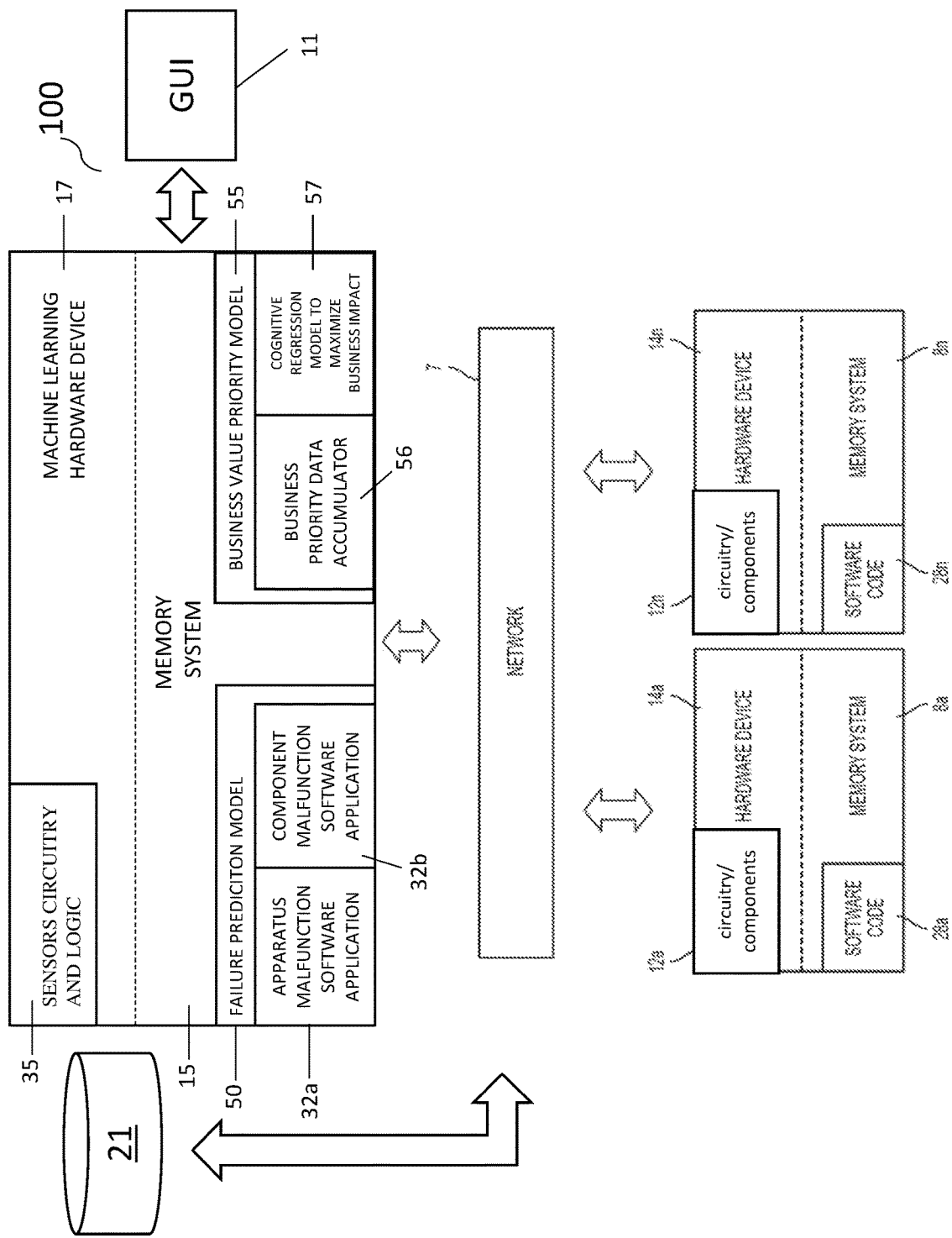
FIG. 1 illustrates one embodiment of a system for a cognitive prioritization model for hardware device, e.g., ATM, prediction maintenance delivery service.

The methods, systems, and computer program products described herein relate to a prioritization model for hardware device prediction maintenance service delivery. In some embodiments, the hardware device being serviced may be an automated teller machine (ATM). An automated teller machine (ATM) is an electronic telecommunications device that enables customers of financial institutions to perform financial transactions, such as cash withdrawals, deposits, transfer funds, or obtaining account information, at any time and without the need for direct interaction with bank staff. It is noted that the methods, systems and computer program products are not limited to only ATM hardware devices. Other examples of hardware devices may include food vending machines, e.g., soda vending machines, and snack vending machines. In some examples, the hardware device may be a ticket vending machine, such as a ticket machine for mass transportation, a ticket machine for entry into a sporting venue, a ticket vending machine for an entertainment venue and other ticket dispensing machines. Coin operated (including credit card operated) sales devices may also be hardware devices serviced by the methods, systems and computer program products described herein, which can include clothing washing and drying machines. The hardware devices can also be arcade/gaming devices. Point of sale devices and systems are also included in the hardware devices that can be services using the products produced by the methods, systems and computer program products that are described herein.

Due to the predictive modeling, the services start to evolve from reactive maintenance to a proactive one. For reactive service, the service calls are placed when systems failures occur and the technicians are arranged for onsite repairs. Additional resources such as financial institution staff or authorized cash handling providers must be coordinated when cash is present. This model can lead to longer machine downtime, resulting greater business lost and customer satisfaction impact.

Predictive maintenance is a proactive service delivery model, which employs a failure predictive module to predict possible system failures. The services are arranged prior to system failure to reduce service downtime. However, because of the challenge of failure prediction and service delivery arrangement, today, a practical prediction window is approximately 4 to 6 weeks. Therefore, the model predicts all possible hardware device failures, e.g., ATM device failures, for the next 4 to 6 weeks. However, since the service delivery teams that are typically assigned to hardware maintenance, e.g., ATM service, do not have the resources typically required to address all hardware proactive maintenance requirements that are predicted by the proactive model, there is a need to prioritize hardware machines so that the devices having the greatest significance are serviced first. How to prioritize the services calls to maximize the benefit of predictive maintenance is an important issue to address.

One can use a predictive score for prioritization. The machine with the highest score leads to higher probability of failure, thus it needs to be serviced first. However, the hardware machine that has the highest probability of failure is not necessarily the hardware machine that has the greatest impact on business considerations for the entity that owns the entirety of hardware machines being maintained.

The methods, systems and computer program products described herein can provide a cognitive prediction model to maximize business value impact on hardware maintenance using multiple parameters. For example, for ATM machines with higher usages, higher cross-bank transactions, higher criticality of needing maintenance and high locality results in higher priority.

FIG. 1 illustrates a system 100 for providing a prioritized model for hardware predictive maintenance service delivery, in accordance with one embodiment of the present disclosure. The system 100 is enable to execute a machine learning framework to prioritize a maintenance schedule giving priority to hardware machines, e.g., ATM machines, that not only need maintenance, but also have a high business value. The machine learning hardware device 17 includes at least two components, i.e, a failure prediction model 50, and a business value priority maintenance generator 55. The business value priority model 55 is developed based upon at least the following predictors and model framework:

a) Score from the failure prediction model 50. The score from the failure prediction model 50 can take into account both the likelihood that specific hardware devices, i.e, apparatus failure, e.g., apparatus failure in ATMs, will need maintenance, e.g., proactive maintenance to avoid a failure that would interrupt the hardware devices ability to function in service; and take into account the component of the apparatus, i.e., ATM, that is likely to fail and is therefore needing proactive maintenance to avoid failure. In embodiments, in which the hardware device being serviced is an ATM, some examples of ATM components that can be proactively serviced can include a card reader, keypad, display screen, receipt printer and cash dispenser, as well as other components and systems employed in ATM's. It is noted that this example is specific for ATM hardware devices, and that other hardware devices may have different components that can be serviced.

b) Machine usages, e.g., total cash withdrawal and/or number of transactions in a hardware device that is an ATM. The machine usage may be one of the business considerations that are used in combination with the failure prediction model to provide the cognitive recognition model to maximize business impact of the maintenance schedule.

c) Cross-operator network transactions, e.g., cross-bank network transactions when servicing ATMs, is another predictor that is used to prioritize the maintenance schedule of a hardware device in order to maximize the business impact of the maintenance schedule. Cross-operator transactions is a factor characterized as a business impact type factor, because if an ATM is down that has a high number of cross-bank transactions, the ATM being out of operation not only impacts the owner/operator, but also impacts all banks that do cross-business through that ATM. This type of device outage can impact the reputation of the ATM operator.

d) Hardware device criticality is another predictor that is used to prioritize the maintenance schedule in order to maximize the business impact of the maintenance schedule. In an example, when the hardware device is an ATM, criticality is characterized as if multiple ATM machines are located at the same location, those ATMs have a lower criticality than an ATM that is the only ATM at a location, because the multiple ATM machines at the same location have redundancy in services. Criticality can also mean that an hardware device, such as an ATM, is present at a high profile location, such as a government center, tourist attraction, business center, or other area of public interest, etc.

e) Hardware device locality is another predictor used to prioritize the maintenance schedule in order to maximize the business impact of the maintenance schedule. Locality is a measure of how close hardware devices, such as ATMs, are geographically within the grouping of hardware devices, such as ATMs, that provides the grouping for maintenance in accordance with the business value priority model, i.e., a business value priority maintenance generator 55. For example, ATMs having a good, i.e., high, locality score are ATMs that are close to one another, e.g., two ATMs having addresses within the same town on the same street, or at a same location, whereas ATMs having a bad, i.e., low, locality score are ATMs that are isolated or far away from the majority of ATMs within the field of ATMs to receive maintenance. For example, ATMs located in groupings close to one another require less time and traveling to maintenance per unit, when compared to a single isolated ATM that is being maintained.

f) Hardware device inventory (e.g. the manufacture and model number of ATMs) is another predictor used to prioritize the maintenance schedule in order to maximize the business impact of the maintenance schedule. The manufacture and model number can serve as a predictor, because this type of information can be relevant to determine the features of the device, and what types of services the device provides. This can have a business impact because a hardware device, such as an ATM, having a large number of features and providing numerous types of services may be appreciated by the public using these devices. When these types of devices are not working, it can negatively impact the reputation of the owner/operator of the hardware devices, e.g., ATMs. Additionally, the manufacturer and model number can be used to determine, whether the model is an easily maintained machine, a machine that takes a lot of labor and to maintain, as well as whether spare ATM units and ATM parts are available.

G) Hardware device failure date vs. predicted failure date data is another predictor used to prioritize the maintenance schedule in order to maximize the business impact of the maintenance schedule. This factor helps to determine how likely a specific hardware device, e.g., ATM, will fail, and how helpful the original failure prediction model is to providing a suitable maintenance schedule. For example, an ATM that is predictable has a higher value in the failure prediction model 50.

It is noted that the above noted factors, i.e., factors a, b, c, d, e, f and g, are used in the machine learning hardware device 17 to develop a cognitive regression model to maximize the business impact based on failure prediction by reducing the failure incidents which are correctly predicted. The above noted factors, i.e., factors a, b, c, d, e, f and g are provided for illustrative purposes only, and the present disclosure is not limited to only these examples.

The machine learning hardware device 17 includes at least two components, i.e, a failure prediction model 50, and a business value priority model, e.g., a business value priority maintenance generator 55, is now described in greater detail starting with the failure prediction model 50 that provides one of the initial factors for providing the priority model.

The failure prediction model 50 can classify hardware or software failures in hardware devices, such as ATMs, based on retrieved sensor data, usage data, prior failure data, and specified machine configurations for providing predictive maintenance solutions for hardware devices, i.e., an automated teller machine (ATM). In some embodiments, the system 100 enables a first model and associated software application, i.e., apparatus malfunction software application 32a, for predicting a hardware failure such that a second model and associated software application, i.e., component malfunction software application 32b, is enabled to predict specified component failure.

Data including sensor based error logs, service and failure records, hardware usage data, hardware performance data and machine configuration, and vendor name and model number for the ATMs within the plurality of devices being maintained by the system 100 is retrieved for input to the first and second model, i.e., apparatus malfunction software application 32a and component malfunction software application 32b.

Additionally, three software windows (e.g., a graphical user interface (GUI) window, configuration file windows, command parameter windows, etc.) of the machine learning framework as generated and executed as follows:

1. An observation windows for interacting with historical error logs, failure records, and transaction records.
2. A prediction window interacting with failure prediction software.
3. A transition window to enable resource placement.

In some embodiments, the system 100 that is depicted in FIG. 1 includes a machine learning hardware device 17 and a database system 21 that is connected through a network 7 to the plurality of hardware devices, e.g., ATM devices 14a . . . 14n, for predictions requiring repair or maintenance.

Additionally, machine learning hardware device 17 is connected or integrated with a user interface (UI) 11. Machine learning hardware device 17 comprises sensors, circuitry, and logic 35 and a memory system 15. Memory system 15 comprises an apparatus malfunction detection software application (and model) 32a and a component malfunction software application (and model) 32b. Memory system 15 may include a single or a plurality of memory systems.

Each hardware device, e.g., ATM device 14a, 14n, may include connection circuitry/components 12a and a (specialized) memory system 8a. Memory system 8a comprises software code 28a. Memory system 8a may include a single memory system or a plurality of memory systems. The hardware device, e.g., ATM device 14n, includes circuitry/components 12n and a (specialized) memory system 8n. Memory system 8n comprises software code 28n. Memory system 8n may include a single memory system or a plurality of memory systems.

In some embodiments, the machine learning hardware device 17 and the hardware devices, e.g., ATM devices 14a . . . 14n, each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment machine learning hardware device 17 and hardware devices, e.g., ATM devices 14a . . . 14n, may each comprise a specialized hardware device comprising specialized (nongeneric) hardware and circuitry (i.e., specialized discrete non-generic analog, digital, and logic based circuitry) for (independently or in combination) executing a process described with respect to FIGS. 2-3. The specialized discrete non-generic analog, digital, and logic based circuitry (e.g., sensors, circuitry, and logic 35 and circuitry/components 12 ... 12n, etc.) may include proprietary specially designed components (e.g., a specialized integrated circuit, such as for example an Application Specific Integrated Circuit (ASIC) designed for only implementing an automated process for improving hardware and software diagnostic technology associated with hardware and failure predictions. Network 7 may include any type of network including, inter alia, a local area network, (LAN), a wide area network (WAN), the Internet, a wireless network, etc. System 100 enables comprises a multistage classification framework enabled to predict hardware failure, i.e., ATM failure.

The framework generates and executes two differing classification software applications and models for the failure prediction model 50. A first model predicts hardware or software system failure, i.e., the apparatus malfunction software application 32a, and a subsequent second model is generated and executed to determine a specified component (of the hardware or software system) failure, i.e., the component malfunction software application 32b. The multiple model implemented prediction method (executed by system 100 of FIG. 1) improves failure prediction performance technology thereby reducing software and model developmental resources. The multistage classification framework utilizes the three differing software windows for enabling the predictions as described, supra. Differing feature extraction and engineering techniques may be leveraged or developed to improve the software and associated models. For example, differing classification algorithms may be applied such as, inter alia, a logistic regression algorithm, a support vector machine algorithm, a random forest algorithm, a gradient boost machine algorithm, XGBoost algorithm, a bagging algorithm, a boosting algorithm, etc.

System 100 generates and enables improved software and model development with respect to reducing software components necessary for implementing a process for predicting and diagnosing hardware and software malfunctions of a hardware device. Additionally, system 100 generates and enables improved software and model development with respect to reducing software components necessary for implementing a process for predicting and diagnosing hardware and software malfunctions of specified components of a malfunctioning hardware device thereby increasing a speed and efficiency of diagnosis.

System 100 executes the following training and prediction processes for producing the failure prediction model 50:

1. A data acquisition process for the failure prediction model 50 can be executed resulting in retrieval of sensor data, hardware device usage data, periodical (e.g., weekly, monthly, etc.) hardware device availability data, hardware device configuration data, hardware device service record data, past repair event data. Sensor data may include, inter alia, time stamped error and warning messages, a status from each hardware machine, etc. Hardware device, e.g., ATM, usage data may include, inter alia, functionality data, transactional data, etc. ATM configuration data may include, inter alia, a machine manufacture, a machine model type, a machine model number, a machine hardware and software configuration, etc. Hardware service record data, such as ATM service record data, may include time stamped service records including, inter alia, incident ticket open time, affected component, repair notes, failure categories, parts, hours for repairs, technician traveling time, etc.

2. Observation windows, transition windows, and prediction windows (i.e., with respect to software) are generated for the failure prediction model 50. For example, an observation window may be associated with a 30 day window, a transition window may be associated with a 7 day window, and a prediction window may be associated with a 28 day window.

3. Two training software application and associated models are generated for the failure prediction model 50. A first training software application and associated model for predicting hardware device failure, i.e., training software application for the apparatus malfunction is generated and a second software application and associated model for predicting component failure for a hardware device that has failed is generated. The first training software application and associated model is enabled to predict if a given device will fail within a prediction window. The second training software application and associated model is enabled to predict a specified component failure when the hardware device has been predicted to fail.

4. A feature engineering process is executed with respect to the first training software application and associated model and the second software application and associated model. The feature engineering process is used to create features (i.e., 2 sets of features for ATM failure predictions and component failure predictions) using data within the observation window. Features may include: a number of error and warning messages or service records from a subsection of an observation window (e.g., 7 days, 14 days, 28 days, etc.), a number of selective pattern of error and warning messages from the subsection of the observation window (e.g., a pattern may comprise an error 123 followed by an error 125 followed by an error 321), encoding for category variable (e.g., one-hot encoding for various machine type and model), higher order features (e.g., a join feature of error code 123 and 456, a non-linear feature, RBF features (Gaussian kernel features), etc.), usage and availability values from a subsection of the observation window, etc.

5. Features are selected and transformed to improve prediction and diagnosis performance. A feature transformation process may include a PCA (principle component analysis) process, an RBF process, etc. A feature selection process may include a forward process, a backward process, a gnni index process, a correlation feature process, etc.

6. A classification algorithm is executed such that a device failure model and component model comprise a training base with respect to its own feature and classification algorithm. The following classification algorithms may be executed: SVM (support vector machine), neuron network, logistic regression, random forest, GBM (gradient boost machine), XGboost, bagging and voting and model aggregation, etc. Additionally, a model aggregation algorithm may be integrated to future runs to improve software application and model performance.

The following steps illustrate an embodiment of the prediction process:

1. A prediction period (e.g., future date) is generated and observation windows are derived.
2. Necessary data is collected within the observation windows.
3. Features are generated for the first training software application and associated model and the second training software application and associated model.
4. The features are filtered and transformed based on results of step 5 of the training process.
5. A hardware device, e.g., ATM device, failure prediction is generated with respect to a specified prediction window.
6. A specified component failure prediction (for the device predicted to fail) is generated.

7. Results of the predictions are refined and presented to the cognitive regression model to maximize the business impact of the machine learning hardware device 17.

It is noted that the above example of the failure prediction model 50 is only one illustrative example, and it is not intended that the present disclosure be limited to only this example. Other data types failure prediction models may also be integrated into the methods, systems and computer program products of the present disclosure, so long as they provide a prediction of device failure.

The cognitive regression model to maximize the business impact, i.e., the business value priority maintenance generator 55, begins with the predictions for hardware failure, e.g. ATM failure, from the failure prediction model 50 and prioritize them to provide a cognitive prioritization model for hardware prediction maintenance service delivery. Providing the cognitive regression model to maximize business impact 55 may include two steps: 1) data preparation (by the business priority data accumulator 56), and 2) cognitive priority model development (by the cognitive priority model development application 57).

The first step of data preparation may be provided by a business priority data accumulator application 56. In some embodiments, the business priority data accumulator application 56 may comprise an embedded device, i.e., a dedicated device or computer, that can include a combination of computer hardware and software (fixed in capability or programmable) specifically designed for executing a specialized function. Programmable embedded computers or devices may comprise specialized programming interfaces. In one embodiment, the business priority data accumulator application 56 may comprise a specialized hardware device comprising specialized (non-generic) hardware and circuitry (i.e., specialized discrete non-generic analog, digital, and logic based circuitry) for (independently or in combination) executing a process described with respect to FIG. 5. The specialized discrete non-generic analog, digital, and logic based circuitry (e.g., sensors, circuitry, and logic 35) may include proprietary specially designed components (e.g., a specialized integrated circuit, such as for example an Application Specific Integrated Circuit (ASIC) designed for only implementing an automated process for improving hardware and software diagnostic technology associated with the cognitive prioritization model for hardware device, e.g., ATM, prediction maintenance service delivery. The business priority data accumulator application 56 of the a business value priority maintenance generator 55 portion of the machine learning hardware device 17 is in communication with the network 7 of the hardware devices, e.g., ATM devices 14a . . . 14n.

In some embodiments, following the score from the failure prediction model 50 being provided to the business priority data accumulator application 56, the application 56 continues with collecting data. Data can be collected by the business priority data accumulator application 56 directly from the hardware devices, e.g., ATMs 14a . . . 14n, over the network 7. For example, each ATM device 14a, 14n may include connection circuitry/components 12a and a (specialized) memory system 8a. Memory system 8a comprises software code 28a. The software code 28a in combination with the connection circuitry/components 12a can function to transmit data specific to the maintenance of the ATM devices 14a . . . 14n to the business priority data accumulator application 56 over the network 7. A user may also enter data specific to the maintenance of the ATM devices 14a . . . 14n through the graphic user interface 11 with the machine learning hardware device 17.

In one embodiment, the business priority data accumulator application 56 starts with collecting data regarding machine usage, i.e., ATM usage. For example, the business priority data accumulator 56 may collect from the users and/or the network 7 of hardware devices, e.g., ATMs 14a, 14n, how many monthly or weekly transactions are being conducted for each of the ATMs 14a, 14n that are within the pool of ATMs being maintained, and within the pool of ATMs that have been scored for proactive maintenance by the failure prediction model 50. In an embodiments, in which the hardware device is an ATM, examples of transactions can include a withdrawal from an ATM, a deposit from and ATM, a balance check from an ATM, etc. It is not necessary that the number of transactions be the unit by which machine usage be measured. For example, machine usage of hardware devices can also be measured by the amount of money that is withdrawn from ATMs 14a, 14n on the network 7.

In some embodiments, following the preparation of the data regarding ATM usage, the business priority data accumulator application 56 identifies cross-bank transaction service charges incurred on the ATM machines 14a, 14b. The business priority data accumulator application 56 determines the number of cross-bank transaction services charges that have been incurred on the ATM machines 14a, 14b for a specified time period, e.g., the number of cross-bank transactions may be collected for a one week time period, or a one month time period.

In some embodiments, the business priority data accumulator application 56 may also define the criticality of each of the ATMs 14a, 14n, i.e., whether each of the ATMs that have been scored by the failure prediction model 50 is the sole ATM at a location or if there are groupings of ATMs, i.e., multiple ATMs, at a location. Criticality may also be a measure of whether the ATM is present at high profile location, such as a government center, tourist attraction, business center, consumer shopping center and other like high profile types of locations.

In some embodiments, the business priority data accumulator application 56 may also define the criticality of each of the hardware devices, e.g., ATMs 14a, 14n. For example, in embodiments in which the hardware device is an ATM, the business priority data accumulator application 56 may consider, whether each of the ATMs that have been scored by the failure prediction model 50 is the sole ATM at a location or if there are groupings of ATMs, i.e., multiple ATMs, at a location.

Defining the number of ATMs at each location that has an ATM within the grouping of ATMs that are scored for predictive maintenance from the prediction model 50 provides data for both a measurement of criticality, and data for assigning a locality value to each ATM that has been scored by the failure prediction model 50. For example, the business priority data accumulator application 56 can extract global positioning system (GPS) coordinates for each ATM that was scored by the prediction model 50. The GPS coordinates can be used to determine the traveling distance that maintenance personal would have to travel to service the ATMs 14a, 14n.

Further data that can be collected by the business priority data accumulator application 56 may also include the specific hardware identification information. In the embodiments, in which the hardware device is an ATM, the ATM manufacture and model number for each of the ATMs 14a, 14b can be scored by the prediction model 50. Similar to the data collected by the business priority data accumulator application 56 described above, the ATM manufacture and model number information may be collected through the network 7 as data transmitted from the ATMs 14a, 14n to the hardware learning machine 17, or may be data entered from the graphic user interface 11.

Finally, the business priority data accumulator application 56 can also collect data on actual failure vs. predictive failure and its score. For example, actual failures of the ATMs 14a, 14n may be collected by the business priority data accumulator application 56 through interaction with the ATMs across the network 7, in which the actual failure information can be stored in the database system 21 of the machine learning hardware device 17. The actual failures can then be compared with the predictive failures from the prediction model 50 to score each of the ATMs 14a, 14n by their consistency with the prediction model 50.

It is noted that the above examples of data collection for the data preparation step of the business value priority maintenance generator 55 is only a set of illustrative examples, and it is not intended that the present disclosure be limited to only these examples. Other data types indicative of business value may also be integrated into the methods, systems and computer program products of the present disclosure.

Following data collection by the business priority data accumulator application 56, the cognitive recognition model to maximize the business impact application, i.e., a business value priority maintenance generator 55, may continue with the cognitive priority model development application 57.

In some embodiments, the cognitive priority model development application 57 may comprise an embedded device, i.e., a dedicated device or computer, that can include a combination of computer hardware and software (fixed in capability or programmable) specifically designed for executing a specialized function. Programmable embedded computers or devices may comprise specialized programming interfaces. In one embodiment, the cognitive priority model development application 57 may comprise a specialized hardware device comprising specialized (non-generic) hardware and circuitry (i.e., specialized discrete non-generic analog, digital, and logic based circuitry) for (independently or in combination) executing a process described with respect to FIG. 6. The specialized discrete non-generic analog, digital, and logic based circuitry (e.g., sensors, circuitry, and logic 35) may include proprietary specially designed components (e.g., a specialized integrated circuit, such as for example an Application Specific Integrated Circuit (ASIC) designed for only implementing an automated process for improving hardware and software diagnostic technology associated with the cognitive prioritization model for hardware device prediction maintenance service delivery, e.g., ATM prediction maintenance service.

The cognitive priority model development application 57 may employ the data collected by the business priority data accumulator application 56 as the input data for the cognitive model. Cognitive priority model development can begin with defining service planning windows, e.g., 1 day, 3 days, 5 days, etc. A service planning window is the number of days between visits that a technician will maintenance a hardware device, such as an ATM. For example, if the service planning window is three (3) days, the delivery manager is assigning the technician for on-site service every three days.

The cognitive priority model development application 57 can then calculate how many hardware machines, e.g., ATMs, will be serviced for each of the planning windows. This calculation can take into account the number of technicians, the travel time a technician needs to take to reach the site of the hardware machine that need service, the number of hardware machines that need service, and the amount of time per service call for each hardware machine being serviced.

Taking into account the service planning windows and the number of hardware machines, e.g., ATMs, that can be services for a planning window, as well as the data on predicted hardware failure from the failure prediction model, the cognitive priority model development application 57 develops a linear regression model to reduce the impact service miss for each window. Linear regression attempts to model the relationship between two variables by fitting a linear equation to observed data. One variable is considered to be an explanatory variable, and the other is considered to be a dependent variable. A number of linear regressions may be used to provide the cognitive priority model. Examples of types of linear regressions suitable for providing the cognitive priority include simple linear regression, multiple linear regression, logistic regression, ordinal regression, multinominal regression and combinations thereof.

The impact service miss is the number of hardware devices, e.g., ATMs, needing maintenance that do not receive service within a planning window. In an example, in which the hardware machine is an ATM, there are scenarios in which the number of ATMs, or the time needed to service the number of ATMs, within a planning window exceed the capacity of the technicians. For example, if a 1 day planning window is in effect, and the prediction window is 30 days, there are 30 windows. The service miss is that the ATM is correctly predicted to fail, however, the predict maintenance service call was not completed by the time the ATM failed. The impact of the service miss is the business lost, e.g., business lost due to transaction loss, cross-bank usage charge, customer satisfaction (CSAT) impact and combinations thereof, due to the service miss.

The impact of the service miss can be minimized by managing the maintenance schedule to prioritize service appointments to hardware devices, e.g., ATMs, that have a high business value. For example, in one embodiments, in which the hardware devices are ATMs, once the prediction model 50 provides a prediction of failure, and the business priority data accumulating application 56 collects data on the hardware devices, e.g., ATMs 14a, 14n regarding machine usage, cross bank network transactions, criticality, locality, ATM inventories, and the score for the actual failure date vs. the predicted failure date, the cognitive priority model development application 57 can provide a regression model illustrating how the technicians can proactively service the system of ATMs 14a, 14n so that any missed called will have a minimized business effect on the system. In some embodiments, the cognitive priority model development application 57 sums up the total miss impact for the prediction window, e.g., all the prediction windows, and minimizes the total impact, i.e, minimizes the total impact on the business effect of the system of missed calls during the totality of the prediction windows. In some embodiments, the cognitive priority model development application 57 may consider running the failure prediction model 50 with a 1 month prediction window every two weeks. If the same ATMs appear on both predictions, and it is not arranged for preventative maintenance, these ATMs have a higher priority.

Results from the cognitive priority model development application 57 of the cognitive recognition model to maximize the business impact application 55 are then reported to a user. The cognitive recognition model to maximize the business impact application 55 (executed by system 100 of FIG. 1) improves failure prediction performance technology thereby reducing software and model developmental resources. System 100 generates and enables improved software and model development with respect to reducing software components necessary for implementing a process for a cognitive recognition model to maximize the business impact of a maintenance schedule. Additionally, system 100 generates and enables improved software and model development with respect to reducing software components necessary for implementing a process for cognitive recognition model to maximize, i.e., prioritize, the business impact of a maintenance schedule thereby increasing a speed and efficiency of computing the maintenance schedule.

Algorithms detailing the process flow enable by System 100 of FIG. 1 is now described with reference to FIGS. 2-4 for the prediction model 50, and with referenced to FIGS. 5 and 6 for the priority data accumulator application 56 and the cognitive priority model development application 57 of the cognitive recognition model to maximize the business impact application 55 for the machine learning hardware 17.

The priority data accumulator application 56 and the cognitive priority development application 57 enable increased computer processing speeds in determining maintenance schedules for hardware devices. As opposed to collecting data failure from all ATMS in real time and responding to failures with services calls with limited service resources, the priority data accumulator application 56 and the cognitive priority development application 57 weight predictive maintenance scores by business factors. This pre-processing reduces real time processing, and enables the service of hardware devices that impact the business of the owner/operator of the hardware devices being serviced. The cognitive priority data accumulator collects data from all the hardware devices being serviced and determines which hardware devices having a high business value. The cognitive regression model to maximize business impact 57 using a regression model weights the score of a predictive failure model for the hardware. The selection of high value maintenance items can reduce the overall computational load for service of the entire hardware pool, thereby increasing processing speed for matching service resources to preemptive service of hardware devices having a high business value. Further, placing the limited resources with the high business value maintenance matters allow for minimized interruptions of the hardware owner/operator business.

Figure 2:
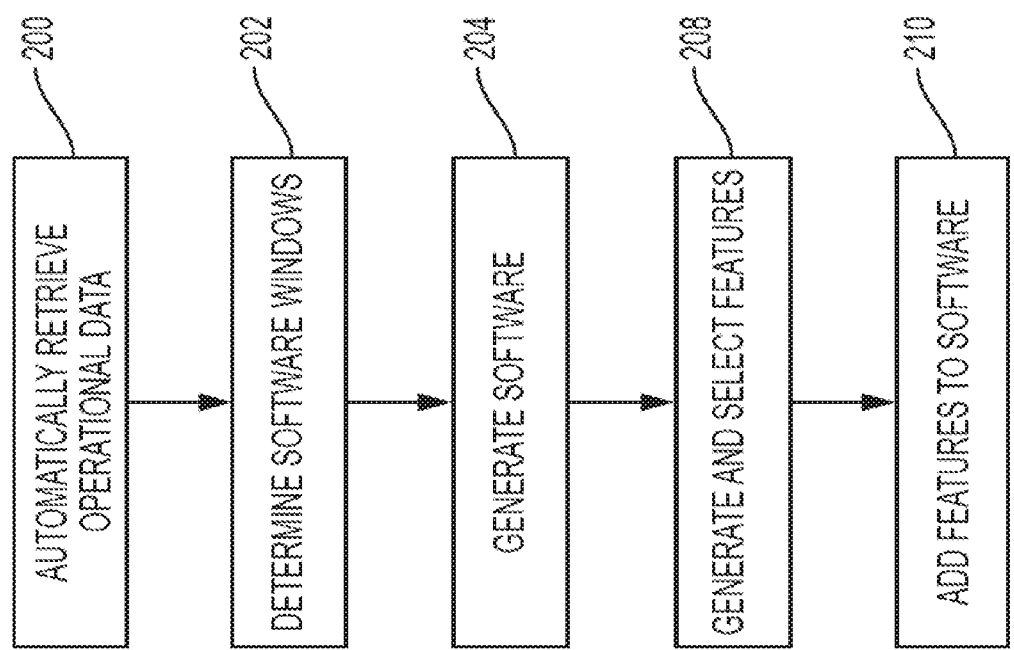
FIG. 2 illustrates a flow chart for one embodiment of an algorithm detailing a process flow enabled by the system of FIG. 1 for generating an apparatus malfunction software application and component malfunction software application for predicting a hardware failure.

FIG. 2 illustrates an algorithm detailing a process flow enabled by system 100 of FIG. 1 for generating apparatus malfunction software application 32a (and associated model of FIG. 1) and component malfunction software application 32b (and associated model of FIG. 1) for predicting a hardware failure, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by machine learning hardware device 17, and hardware devices, such as ATM device 14a, and ATM device 14b, as depicted in FIG. 1.

In step 200, operational data is retrieved (statically or in real time by machine learning hardware device 17 of FIG. 1). The operational data is associated with operation of a hardware device (e.g., ATM device 14a and/or 14b of FIG. 1) being monitored for potential failure. In the embodiments, in which the hardware device is an ATM, the operational data may include sensor data (retrieved from device monitoring sensors such as, inter alia, an optical sensor, a temperature sensor, an RFID sensor, a voltage sensor, etc.) associated with operation and usage of the ATM device, past ATM performance and failure data associated with the ATM device, data describing a configuration of the ATM device, periodic availability data associated with the ATM device, etc.

In step 202, differing time frame software windows associated with observing the operational data and the ATM device are generated and determined. Additionally, the operational data is analyzed with respect to the differing time frame observation software windows. The differing time frame observation software windows may include:

1. A first time frame observation window for presenting historical error logs, failure records, and transactional records for the hardware device.
2. A second time frame prediction window for presenting predictions associated with the hardware or software malfunction of the hardware device and possible failure of a group of electrical/mechanical components.
3. A third time frame transition window for presenting repair based timeframes for repairing the hardware device.

In step 204, an apparatus malfunction prediction software application 32a is generated based on results of step 202. The apparatus malfunction prediction software application 32a is configured for predicting hardware or software malfunction of the hardware device. Additionally, a component prediction software application 32b is generated based on the apparatus malfunction prediction software application 32a. The component malfunction prediction software application 32b is configured for predicting a malfunction of specified components of the hardware device based on the determined hardware or software malfunction of the hardware device. In some embodiments, the hardware device is an ATM.

In step 208, features associated with execution of the apparatus malfunction prediction software application 32a and the component prediction software application 32b are generated and selected based on the operational data and the hardware device viewable within the software windows. A first group of features is selected for the apparatus malfunction prediction software application 32a and a second group of features is selected for the component prediction software application 32b. The first group of features and the second group of features may comprise the same or differing features. The features may include: error and warning messages associated with past malfunctions of the hardware device, a selective pattern of said error and warning messages retrieved from the differing time frame observation software windows, encoding data associated with machine information of the hardware device, high order features of the hardware device, and usage and availability values retrieved from the differing time frame observation software windows.

In step 210, the first group of features (of the features of step 208) is added to software code of the apparatus malfunction software application resulting in generation of a modified apparatus malfunction prediction software application. Additionally, the second group of differing features (of the features of step 208) is added to software code of the component prediction software application resulting in generation of a modified component prediction software application.

Figure 3:
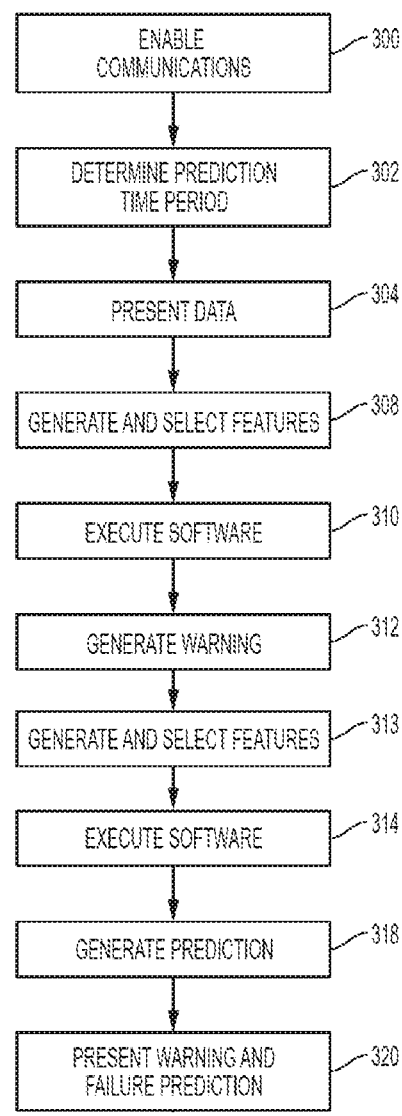
FIG. 3 illustrates a flow chart for one embodiment of an algorithm detailing a process flow enabled by the system of FIG. 1 for executing an apparatus malfunction software application and component malfunction software application for predicting a hardware failure.

FIG. 3 illustrates an algorithm detailing a process flow enabled by system 100 of FIG. 1 for executing apparatus, i.e., ATM, malfunction software application 32a (and associated model of FIG. 1) and component malfunction software application 32b (and associated model of FIG. 1) for predicting a specified hardware component failure, i.e., component failure in ATMs, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by machine learning hardware device 17, hardware device 14a, and hardware device 14b of FIG. 1.

In step 300, communications between the machine learning hardware device 17 and the hardware device, i.e., ATM being predicted to malfunction, are enabled. In step 302, a specified prediction time period and an associated time frame observation software window of the generated (in step 202 of FIG. 2) time frame observation software window are determined. In step 304, associated data of operational data (e.g., of step 200 of FIG. 2) is presented within an associated time frame observation software window. In step 308, first specified features associated with the first group of features (of step 208 of FIG. 2) are generated and selected. In step 310, the modified apparatus, i.e., ATM, malfunction prediction software application (of step 210 of FIG. 2) is executed with respect to the associated data and the first group of specified features. In step 312, a warning indicating a prediction associated with a hardware or software malfunction of the ATM hardware device is generated in response to step 310. In step 313, second specified features associated with the second group of features (of step 208 of FIG. 2) are generated and selected. In step 314, the modified component prediction software application (of step 210 of FIG. 2) is executed (in response to the warning) with respect to the associated data, the second group of specified features, and the hardware or software malfunction of the hardware device.

In step 318, prediction data is generated. The prediction data indicates a group of electrical/mechanical components of the hardware device that may be causing the hardware or software malfunction of the hardware device. In step 320, the warning and data indicating possible failure of the group of electrical/mechanical components are presented to the cognitive recognition model 55 to maximize the business impact application for the machine learning hardware 17 (via software) with respect the associated time frame observation software window.

Figure 4:
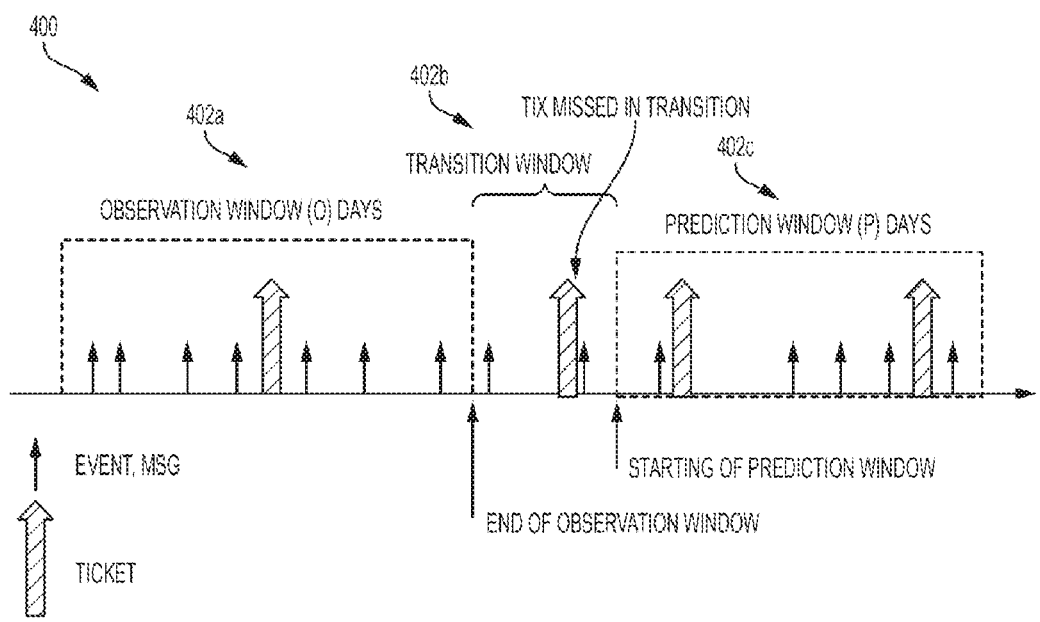
FIG. 4 illustrates a graphical representation associated with the system of FIG. 1 for presenting differing time frame observation windows, in accordance with embodiments of the present invention.

FIG. 4 illustrates a graphical representation 400 for presenting the differing time frame observation windows of FIGS. 1-3, in accordance with embodiments of the present invention. Graphical representation 400 of FIG. 4 includes an observation window 402a, a transition window 402b, and a prediction window 402c. Graphical representation 400 of FIG. 4 illustrates the interface between the observation window 402a, the transition window 402b, and the prediction window 402c. Graphical representation 400 is enabled to predict future repairs within prediction windows and uses events, messages, and historical tickets for analysis. Additionally, error messages retrieved from sensors are presented via graphical representation 400. Graphical representation 400 may be presented by system 100 via GUI 11 of FIG. 1.

Figure 5:
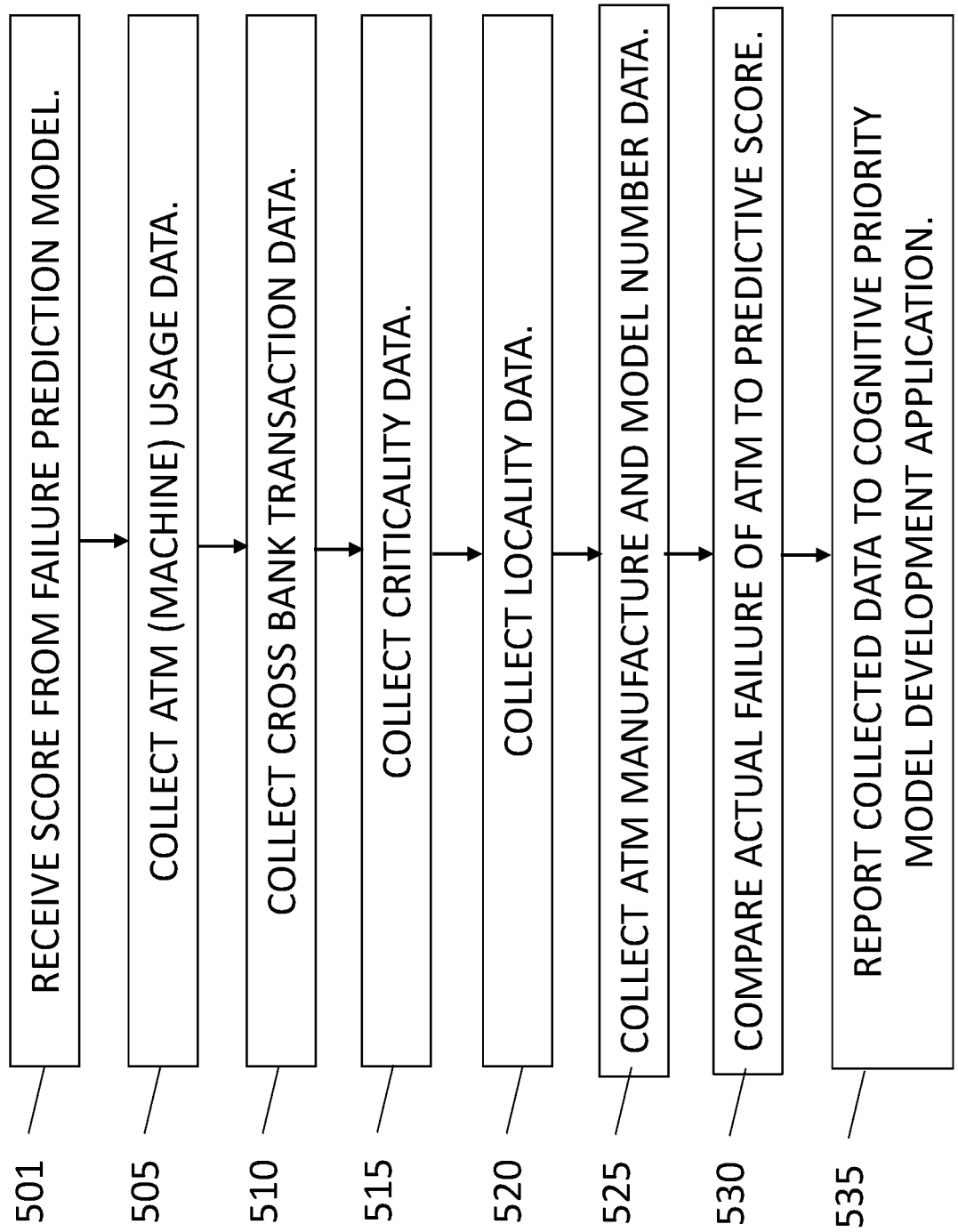
FIG. 5 illustrates a flow chart for one embodiment of an algorithm detailing a process flow enabled by the system of FIG. 1 for executing a priority data accumulator application of the cognitive recognition model to maximize the business impact application for the machine learning hardware.

FIG. 5 illustrates an algorithm detailing a process flow enabled by system 100 of FIG. 1 for executing a priority data accumulator application 56 of the Cognitive Recognition Model to Maximize the Business Impact Application 57 for the machine learning hardware 17. Each of the steps in the algorithm of FIG. 5 may be enabled and executed in any order by a computer processor(s) executing computer code. Additionally, each of the steps in the algorithm of FIG. 5 may be enabled and executed in combination by machine learning hardware device 17, ATM device 14a, and ATM device 14b of FIG. 1.

In step 501, the priority data accumulator application 56 receives a score from the failure prediction model. As noted above, the score from the failure prediction model 50 illustrates for each hardware device, e.g., ATM, the likelihood of failure within a window, and also provides a score for the likelihood of a component failure within the hardware device, e.g., ATM, within the time window. The priority data accumulator application 56 collects data either in real time or statically for prioritizing the score from the failure prediction model 50 to provide that any missed service for a hardware device within the plurality of hardware devices being services has a minimum business impact. The data collected by the data accumulator 56 may be directly collected over the network 7 from the hardware devices, e.g., ATM hardware machines 14a, 14b, or the data collected is entered by a user through a graphic user interface (GUI) 11, as depicted in FIG. 1.

In some embodiments, at step 505, the priority data accumulator application 56 collects machine usage data. As described above in the description of the priority data accumulator application 56 in system 100 that is depicted in FIG. 1, the machine usage data may be transaction data, e.g., how many monthly or weekly transactions are performed at the hardware devices, e.g., ATMs. Additionally, in examples in which the hardware device is an ATM, the transaction data may include how much money is processed, e.g., withdrawn and/or deposited, by the ATMs. The transaction data may correspond actions within a transaction time period of one day, one week, one year, etc.

In some embodiments, at step 510, the priority data accumulator application 56 identifies cross-party transaction service charges incurred on the hardware devices. The hardware devices may be ATMs, and the cross-party transaction service charges may be cross-bank transaction charges. As described above in the description of the priority data accumulator application 56 in system 100 that is depicted in FIG. 1, the cross bank transaction data can help to determine whether a specific ATM is involved in high number of cross-bank transactions, in which this type of device when it fails can negatively impact the business reputation of the operator of the ATM.

In some embodiments, at step 515, the priority data accumulator application 56 collects hardware device, e.g., ATM, manufacture and model number, and at step 520 the priority data accumulator application 56 can collect data regarding the actual failure of a hardware device, e.g., ATM, and compare that to the score for predictive failure that is received from the from the failure prediction model 50. The value of this data has been described in greater detail with reference to the priority data accumulator application 56 of FIG. 1.

At step 515, the priority data accumulator application 56 collects hardware device, e.g., ATM, manufacture and model number, and at step 520 the priority data accumulator application 56 can collect data regarding the actual failure of a hardware device, e.g., ATM, and compare that to the score for predictive failure that is received from the from the failure prediction model 50. The value of this data has been described in greater detail with reference to the priority data accumulator application 56 of FIG. 1.

At step 525, the Business Priority Data Accumulator application 56 transmits the collected prioritization data from steps 501, 505, 510, 515, and 520 to the cognitive priority model development application 57.

Figure 6:
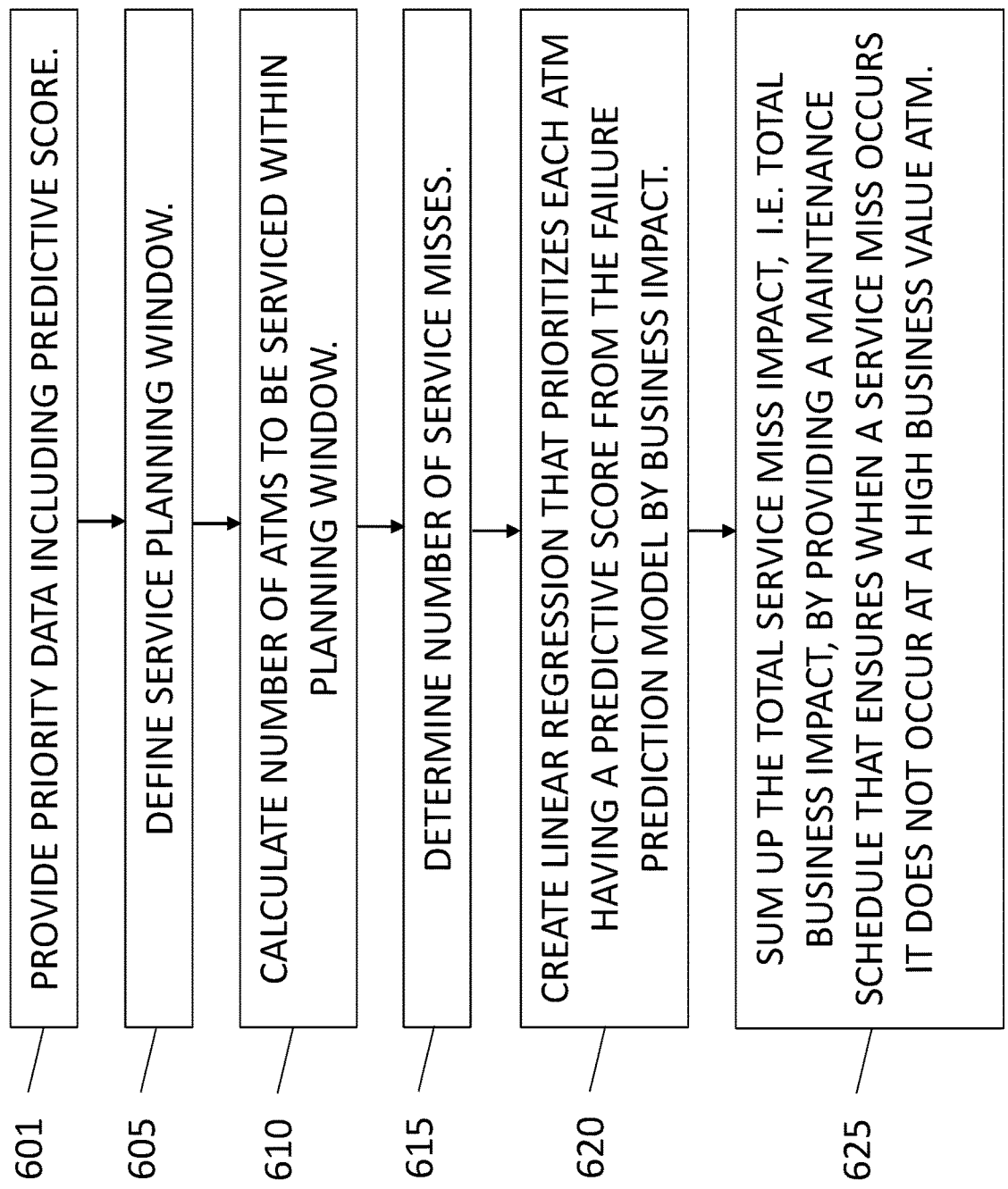
FIG. 6 illustrates a flow chart for one embodiment of an algorithm detailing a process flow enabled by the system of FIG. 1 for executing a cognitive priority model development application of the cognitive recognition model to maximize the business impact application for the machine learning hardware.

FIG. 6 illustrates an algorithm detailing a process flow enabled by system 100 of FIG. 1 for executing the cognitive priority model development application 57 of the cognitive recognition model to maximize the business impact application 55 for the machine learning hardware 17. Each of the steps in the algorithm of FIG. 6 may be enabled and executed in any order by a computer processor(s) executing computer code. Additionally, each of the steps in the algorithm of FIG. 6 may be enabled and executed in combination by machine learning hardware device 17, Hardware device 14a and Circuitry/Components 12a, and ATM device 14b of FIG. 1.

In step 601, the cognitive priority model development application 57 receives the priority data received from the priority data accumulator application 56, which includes the predictive failure score from the failure prediction model 50.

In step 605, the cognitive priority model development application 57 defines service delivery planning windows, e.g., 1 day, 3 days, 5 days, etc. The service planning window may be set by user interface to the cognitive priority model development application 57 via the GUI 11 of the system 100 depicted in FIG. 1.

In step 610, the cognitive priority model development application 57 calculates how many hardware machines, e.g., ATMs, will be services for each of the planning windows. This calculation may take into account the number of hardware machines, e.g., ATMs, that are in communication with network 7. This can be calculated in real time, as well as statically. In one embodiment, the number of technicians for servicing the hardware devices, e.g., ATMs, may be entered into the system by the user via the graphic user interface 11. In an example, in which the hardware device is an ATM, the hours of a typical service call on each of the ATMs may be collected from the ATMs. 14a, 14n through communication through the network 7, e.g., in real time, or the information can be entered by the user via the graphic user interface 11.

In step 615, from the service planning window, and the number of hardware machines, e.g., ATMs, within the service plan, and the number of service technicians, and the number of hours required to service each ATM, the cognitive priority model development application 57 determines the number of service misses within each planning window.

At step 620, the cognitive priority model development application 57 creates a linear regression that prioritizes each of the hardware devices having a predictive score from the failure prediction model 50 by business impact. In the embodiments, in which the hardware devices are ATMs, the business impact is a weighted score taking into account machine usage data, cross-bank transactions, ATM criticality, ATM locality, ATM manufacture and model number, and a measure of when an actual failure of an ATM matches the score for predictive failure for the ATM. The priority weighting for business impact reduces the impact of service misses for each planning window. If 1 day planning window is used; and the prediction window is 30 days, there are 30 windows. The service miss is that the machine is correctly predicted which will be fail, however, predict maintenance service call has not be arranged. The impact is the business lost (due to transaction loss, cross-bank usage charge, CSAT impact. etc.) due to the service miss. In the embodiments, in which the hardware device is an ATM, by prioritizing the predictive score taking account business impact of a service miss, the cognitive priority model development application 57 can select ATMs for a service miss that will not drastically impact the business of the ATM operator.

At step 625, the cognitive priority model development application 57 sums up the total service miss impact for the prediction window and minimize the total impact, i.e., total business impact, by providing a maintenance schedule that ensures when a service miss occurs it does not occur at a high business value hardware device, such as a high business value ATM; but instead occurs for a hardware device having a low business impact, such as an ATM having a low business impact.

Figure 7:
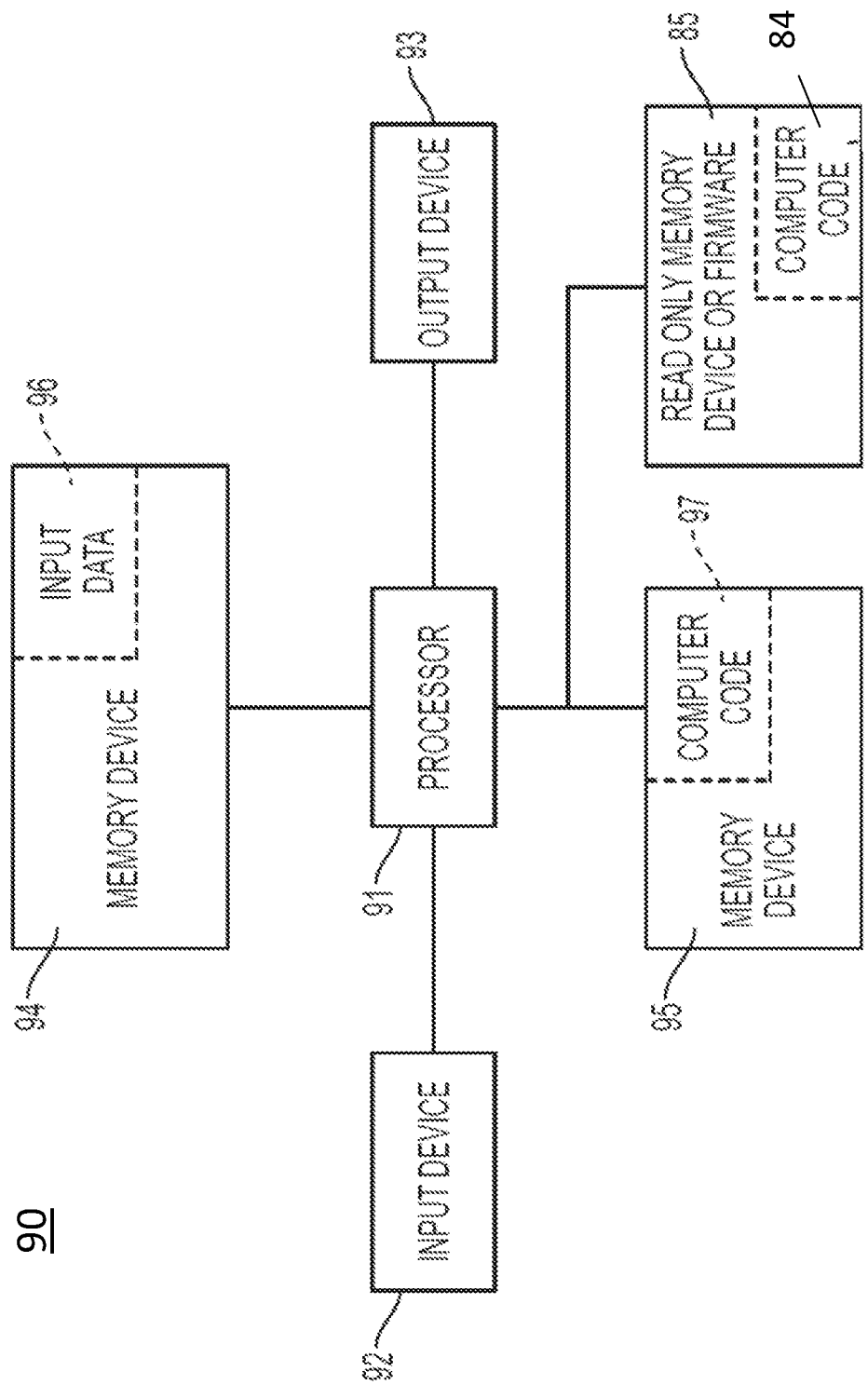
FIG. 7 illustrates a one embodiment of a computer system used by the system of FIG. 1 for enabling a process for improving hardware and software diagnostic technology associated with failure predictions.

FIG. 7 illustrates a computer system 90 (e.g., hardware device 17, hardware device 14a, and hardware device 14b of FIG. 1) used by or comprised of the system 100 of FIG. 1 for producing a cognitive prioritization model, i.e., prioritizing for reduced business impact, for hardware device prediction maintenance service delivery, in accordance with embodiments of the present disclosure. In some embodiments, the hardware device predictive maintenance service delivery is applicable to the service of ATMs. Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks. The flowchart and block diagrams in the FIGS. 1-9 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc, which can work with the graphic user interface 11 that is depicted in FIG. 1. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2, 3, and 5 and 6) for producing a cognitive prioritization model, i.e., prioritizing for reduced business impact, for hardware device prediction maintenance service delivery. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices (such as read only memory device 96) may include algorithms (e.g., the algorithm of FIGS. 2, 3, 5 and 6) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, non-removable, read-only storage medium such as a Read-Only Memory (ROM) device 85, or may be accessed by processor 91 directly from such a static, non-removable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve hardware and software diagnostic technology associated with failure predictions. Thus, the present invention discloses a process for deploying, creating, integrating, hosting, maintaining, and/or integrating computing infrastructure, including integrating compute readable code into the computer system 90, wherein the code in combination with the computer system 90 is capable of performing a method for enabling a process for improving hardware and software diagnostic technology associated with failure predictions. In another embodiment, the disclosure provides a business method that performs the process steps of the invention on a subscription, advertising, and/or fee basis.

That is, a service supplier, such as a Solution Integrator, could offer to enable a process for improving hardware and software diagnostic technology associated with failure predictions. In this case, the service supplier can create, maintain, support, etc. a computer infrastructure that performs the process steps of the disclosure for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment (e.g., Internet of thing (JOT)) now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 8:
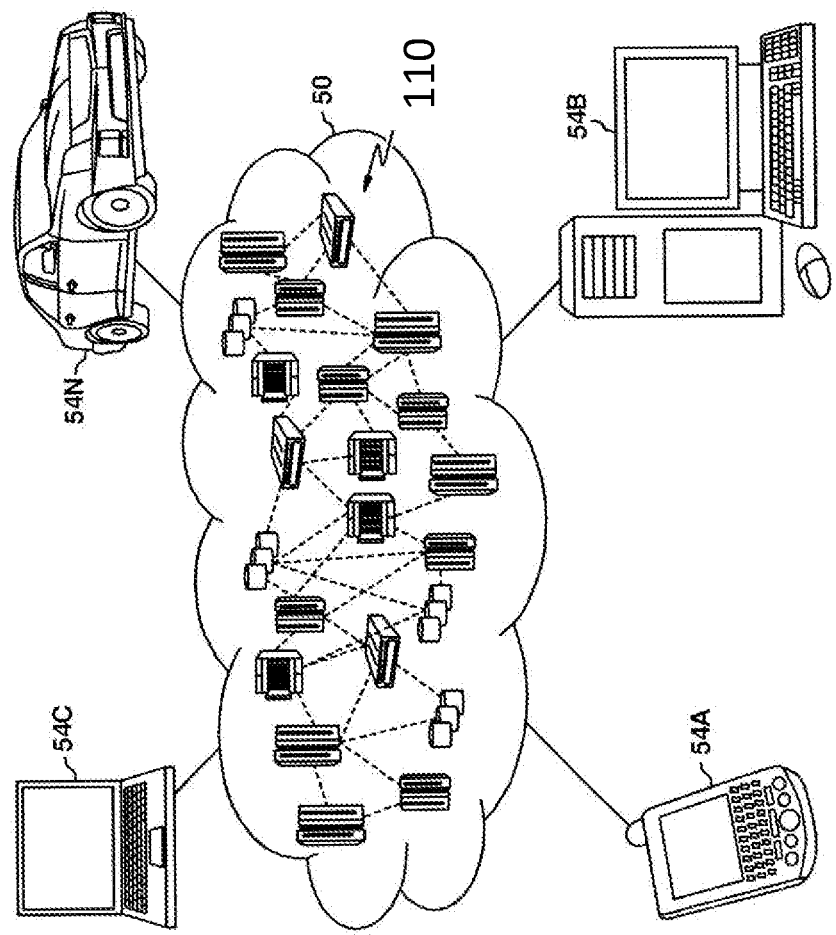
FIG. 8 illustrates a cloud computing environment, in accordance with embodiments of the present invention.

Referring now to FIG. 8, illustrative cloud computing environment 110 is depicted. As shown, cloud computing environment 110 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 110 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
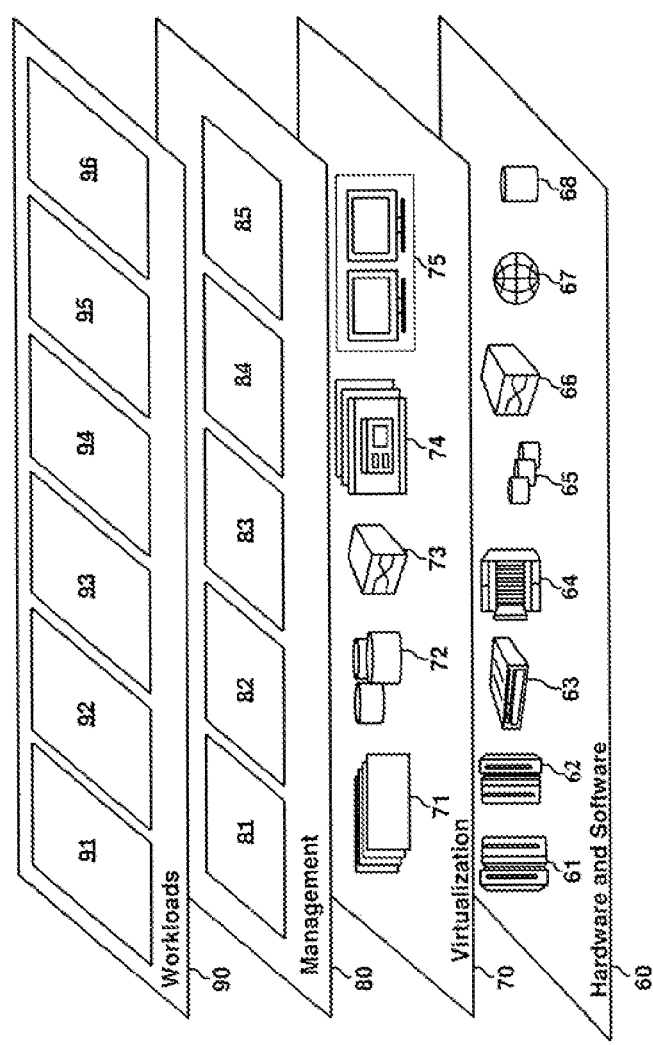
FIG. 9 illustrates a set of functional abstraction layers provided by cloud computing environment, in accordance with embodiments of the present invention.

Referring now to FIG. 9, a set of functional abstraction layers provided by cloud computing environment 110 (see FIG. 8) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for a cognitive recognition model to maximize the business impact 96 in hardware devices in accordance with FIGS. 1-8.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method of providing a maintenance schedule using a predictive failure score that is prioritized by business impacts comprising:

receiving a predictive failure score for each hardware device failure within a plurality of hardware devices to be serviced, the predictive failure score produced by a predictive process that includes employing sensors for each of the hardware devices to record failure messages, performing a training step for training a two application predictive model using the recorded failure messages to predict hardware device failure for a first application and component failure within the hardware devices for a second application; and generating the predictive failure score from the first and second applications of the predictive model, wherein the hardware devices are automated teller machines (ATMs);

setting at least one window to service said plurality of hardware devices based on the predictive failure score;

determining a number of service misses for said plurality of hardware devices during said at least one window;

prioritizing by a processor of a machine learning hardware device each hardware device having a predictive score for failure by a business impact factor, the business impact factor ranking the hardware devices by a number of cross bank transactions, wherein hardware devices having a greater number of cross bank transactions have a higher business impact factor than hardware devices having a lower number of cross bank transactions;

generating by the processor of the machine learning hardware device a maintenance schedule for the plurality of hardware devices to be serviced using the predictive score that has been prioritized by said business impact factor, wherein said service misses are selected for hardware devices having a lowest priority by said prioritizing of said predictive score by said business impact factor, the use of prioritizing by the business impact factor increasing speed for the processing of the maintenance schedule by the processor; and scheduling a service call to the hardware devices in accordance with the maintenance schedule that was prioritized by the business impact factor.

2. The method of claim 1, wherein the business impact factor comprises a number of transactions conducted for said each of the hardware devices having a predictive score.

3. The method of claim 2, wherein the number of transactions are selected from the group consisting of a number of cash withdrawals, a number of deposits, a number of balance checks, a number of cross bank transactions, and a combination thereof.

4. The method of claim 3, wherein a greater a number of transactions for said each of the hardware having the predictive score, a higher the priority for said each of the hardware devices, and a lower a number of the transactions for said each of the hardware devices having the predictive score a lower the priority said each of the hardware devices.

5. The method of claim 1, wherein the business impact factor comprises a measurement of a number of hardware devices proximate to a geographical location.

6. The method of claim 1, wherein the number of hardware devices is used to prioritize the predictive score by criticality of hardware devices, locality of hardware devices or a combination thereof, wherein criticality is a measure of the number of hardware devices at a single location and locality is the distance of a hardware device at a first location relative to a hardware device at a second location.

7. The method of claim 6, wherein a lower a number of hardware devices at a single location a higher criticality value for the hardware device at the single location, and a higher a number of hardware devices at a single location a lower the criticality value for the hardware device at the single location, the higher said criticality value the higher said priority for the hardware device.

8. The method of claim 6, wherein an isolated hardware device that is geographically further from a concentration of a plurality of hardware devices has a lower locality value than a close hardware device to the concentration of the plurality of hardware devices, the higher said locality value the higher said priority for the hardware device.

9. The method of claim 1, wherein business impact factor comprises a manufacturer of the hardware device, a model number of the hardware device, or a combination thereof.

10. The method of claim 1, wherein the business impact factor comprises a comparison of actual failure of said hardware device to the predictive score.

11. The method of claim 1, wherein said prioritizing by the processor of the machine learning hardware device for each hardware device having a predictive score for failure by the business impact factor comprises a regression model.

12. The method of claim 1, wherein said determining the number of service misses for the plurality of hardware devices during the window includes analyzing the time of the window, analyzing the number of hardware devices in the plurality of hardware devices, analyzing a number of service technicians performing said maintenance schedule, and analyzing time by said service technicians on service call for the plurality of hardware devices.

13. A non-transitory computer readable storage medium comprising a computer readable program for providing a maintenance schedule using a predictive failure score that is prioritized by business impacts, wherein the computer readable program when executed on a computer causes the computer to perform the steps of:

generating by a processor of a machine learning hardware device the predictive failure score for each hardware device failure within a plurality of hardware devices to be serviced, the predictive failure score produced by a predictive process that includes employing sensors for each of the hardware devices to record failure messages, performing a training step for training a two application predictive model using the recorded failure messages to predict hardware device failure for a first application and component failure within the hardware devices for a second application; and generating the predictive failure score from the first and second applications of the predictive model, wherein the hardware devices are automated teller machines (ATMs);

setting at least one window to service said plurality of hardware devices based on the predictive failure score;

determining by the processor a number of service misses for said plurality of hardwire devices during said at least one window;

prioritizing by the processor of the machine learning hardware device each hardware device having a predictive score for failure by a business impact factor, the business impact factor ranking the hardware devices by a number of cross bank transactions, wherein hardware devices having a greater number of cross bank transactions have a higher business impact factor than hardware devices having a lower number of cross bank transactions;

generating by the processor of the machine learning hardware device a maintenance schedule for the plurality of hardware devices to be serviced using the predictive score that has been prioritized by said business impact factor, wherein said service misses are selected for hardware devices having a lowest priority by said prioritizing of said predictive score by said business impact factor, the use of prioritizing by said impact business factor increasing speed for the processing of the maintenance schedule by the processor; and scheduling a service call to the hardware devices in accordance with the maintenance schedule that was prioritized by the business impact factor.

14. A computer system comprising a computer processor, a computer-readable storage medium, and program instructions stored on the computer-readable storage medium being executable by the processor, to cause the computer system to:

generate a predictive failure score for each hardware device failure within a plurality of hardware devices to be serviced, the predictive failure score produced by a predictive process that includes employing sensors for each of the hardware devices to record failure messages, performing a training step for training a two application predictive model using the recorded failure messages to predict hardware device failure for a first application and component failure within the hardware devices for a second application; and generating the predictive failure score from the first and second applications of the predictive model, wherein the hardware devices are automated teller machines (ATMs);

set at least one window to service said plurality of hardware devices based on the predictive failure score;

determine a number of service misses for said plurality of hardwire devices during said at least one window;

prioritize the hardware device having a predictive score for failure by a business impact factor, the business impact factor ranking the hardware devices by a number of cross bank transactions, wherein hardware devices having a greater number of cross bank transactions have a higher business impact factor than hardware devices having a lower number of cross bank transactions;

generate a maintenance schedule for the plurality of hardware devices to be serviced using the predictive score that has been prioritized by said business impact factor, wherein said service misses are selected for hardware devices having a lowest priority by said prioritizing of said predictive score by said business impact factor, the use of prioritizing by said impact business factor increasing speed for the processing of the maintenance schedule by the processor; and scheduling a service call to the hardware devices in accordance with the maintenance schedule that was prioritized by the business impact factor.

* * * * *